July 12, 1938.     J. SINKO     2,123,811
HANDWHEEL TURNING DEVICE
Filed March 21, 1938
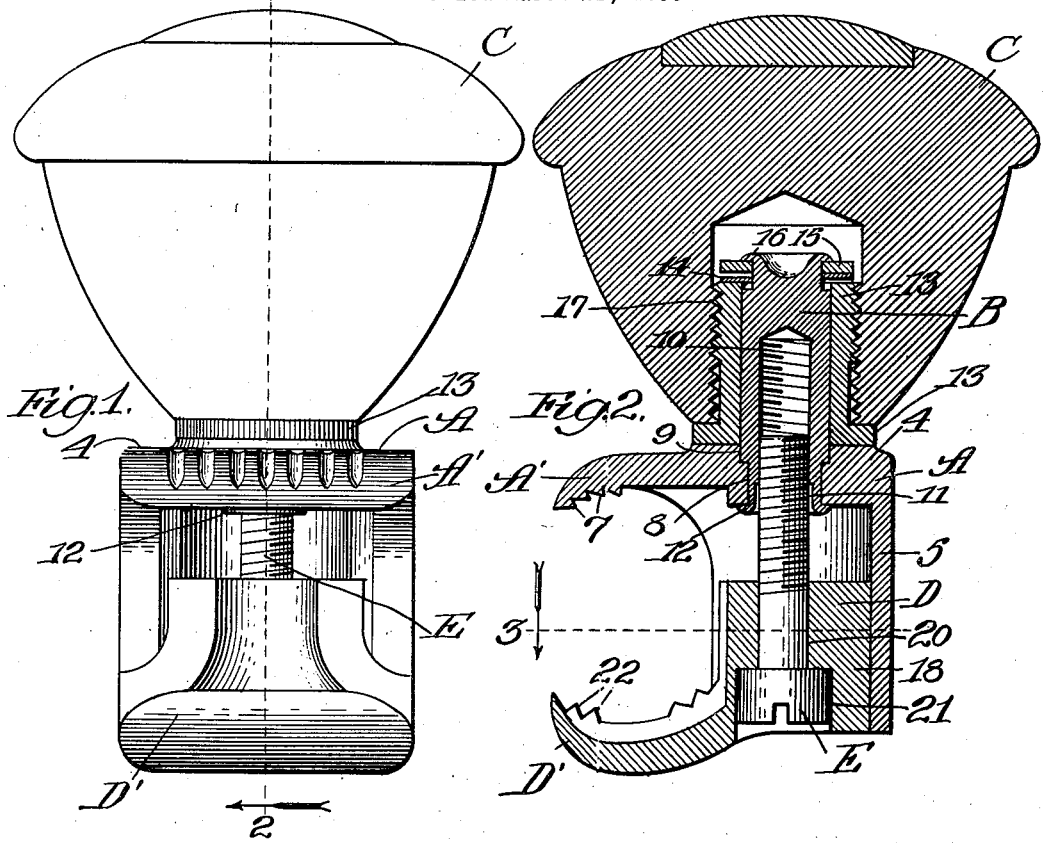
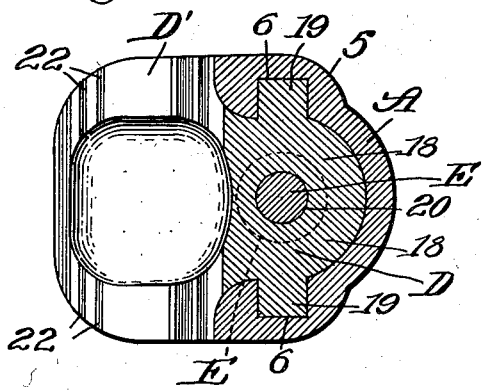
Inventor:
John Sinko,
By Chritton, Wiles, Davies, Hirsch & Dawson,
Attys.

Patented July 12, 1938

2,123,811

UNITED STATES PATENT OFFICE 2,123,811

HANDWHEEL TURNING DEVICE

John Sinko, Oak Park, Ill.

Application March 21, 1938, Serial No. 197,287

3 Claims. (Cl. 74—557)

This invention relates to a hand wheel turning device, and more particularly to an improved clamping bracket for rotatably securing a hand knob to the rim of a wheel.

The primary object of the invention is to provide a compact, strong clamping device of attractive appearance which will firmly grip a hand wheel rim of circular cross-section by pressure applied by means of a concealed clamping screw.

A further object of the invention is to provide a bracket which may be applied to any portion of the rim of the hand wheel without regard to the spoke positions and in a way to either increase or decrease the effective moment. Thus, if the operator has a wheel which is of larger diameter than he desires, the knob may be positioned on the inside of the rim so as to decrease the radius, and conversely, if the steering wheel is too small, the knob may be positioned externally of the rim to increase the radius of rotation.

Heretofore, it has been proposed to secure knobs for the same general purpose to a steering wheel by means of a single metal strap, but such devices were of unattractive appearance and were found to be unreliable on rims of circular cross-section as the bracket had a tendency to turn with respect to the rim. Other devices have been used wherein several screws were employed to secure the bracket to a spoke and rim.

The invention is illustrated in a preferred embodiment in the accompanying drawing, in which:

Figure 1 is a front elevational view of a hand wheel turning device embodying the invention; Fig. 2, a vertical sectional view, taken as indicated at line 2 of Fig. 1; and Fig. 3, a plan sectional view, taken as indicated at line 3 of Fig. 2.

In the embodiment illustrated, A designates a hollow upper bracket provided with a clamping jaw A'; B, a pivot stud secured to the bracket A; C, an ornamental hand knob; D, a lower bracket member slidably mounted in the bracket A and provided with a concave clamping jaw D'; and E, a clamping cap screw.

The bracket A preferably comprises an ornamental die casting having a top wall 4 and a downwardly extending skirt portion 5 providing ways 6 to receive lands provided on the lower bracket member D. A concave clamping jaw A' is provided with suitable teeth 7 adapted to bite into the upper face of the steering wheel rim. The upper wall 4 is bored, as indicated at 8, to receive the lower end of the stud member B and has a counterbore 9 of somewhat larger diameter.

The stud member B is hollow and tapped, as indicated at 10, to receive the threaded shank of the clamping screw E. Its lower end is of reduced diameter so that its shoulder portion may enter the counterbore 9 and its reduced end portion will fit snugly in the bore 8. Preferably the lower end of the threaded portion is counterbored, as indicated at 11, and its extreme end portion is swaged beneath the wall 4, as indicated at 12, to firmly secure the stud in position.

A journal member 13 is pivotally mounted on the stud B so that its lower end bears against the top wall 4 of the bracket A and its upper end is engaged by the spring washer 14 which yieldingly increases the downward pressure of the journal member so as to increase the friction between the two faces and make the members more resistant to relative rotation. A washer 15 rests on the spring washer 14 and is held in position by having the upper end of the stud member B swaged thereover, as indicated at 16.

The handle member C may be of any desired convenient shape and may be cemented to the journal member 13 or secured thereto by means of screw threads, as indicated at 17.

The lower bracket member D comprises a slide block 18 having lands 19 which fit the ways 6 of the upper bracket and prevent rotation with respect thereto. The block has a main bore 20 in register with the stud B and a counterbore 21 adapted to receive and conceal the head of the cap screw. The concave clamping jaw D' is integrally formed with the slide block and has teeth 22 to engage the lower face of the rim. The cap screw E is of well-known construction and serves to draw the upper and lower clamping jaws into firm engagement with the steering wheel rim.

As will be readily understood, the spring washer prevents the knob from spinning freely on the bracket and eliminates any danger of rattle of the upper parts.

To install the device, the rim of the wheel is interleaved between the jaws, and the clamping screw E is tightened firmly so as to cause the teeth to bite into the wheel. The device is then ready for use and it may be noted that there are no exposed parts presenting sharp corners, screw heads, or the like, to catch in the operator's clothing or spoil the appearance of the attachment.

The foregoing detailed description has been given for clearness of understanding only, and no unnecessary limitations should be understood therefrom, but the appended claims should be construed as broadly as permissible, in view of the prior art.

I claim:

1. A steering wheel turning device comprising: a hollow upper bracket provided with an integrally formed concave jaw adapted to engage a portion of the upper face of the rim of a steering wheel, a hollow tapped stud extending through the top of said bracket and fixed thereto, a handle frictionally pivoted on the upper end of said stud so as to rotate resistantly thereon; a lower bracket slidably mounted in said upper bracket and held against rotation by means of lands and ways, said lower bracket having an integrally formed concave jaw to engage the lower face of said steering wheel rim; and a headed screw adapted to extend through said lower bracket into the tapped stud and draw said jaws into clamping engagement with the rim.

2. A device as specified in claim 1, in which a journal member is provided on the stud to hold the handle, said journal member having its lower end bearing against the top of the upper bracket, and a spring washer is interposed between the top of the journal member and the upper end of the stud so as to yieldingly urge said journal member against the bracket.

3. A steering wheel turning device comprising: a hollow upper bracket provided with an integrally formed concave jaw having teeth adapted to engage the upper face of a steering wheel rim, the top of said bracket being bored and counterbored to receive a pivot stud, a hollow tapped stud provided with a shoulder resting in said counterbore and having its lower end swaged to the bracket; a handle resistantly journalled on said stud; a lower bracket having lands slidably mounted within ways provided in the upper bracket, said lower bracket having a concave toothed jaw to engage the lower face of said rim, and said lower bracket having a bore in register with the stud, the lower end of said bore being counterbored to receive a machine screw head; and a cap screw having its head journalled in the lower bracket counterbore and its shank extending into the stud so as to draw the clamping jaws of the brackets against the steering wheel rim.

JOHN SINKO.